Jan. 1, 1924
A. W. JOHNSON ET AL
1,479,241
LOCKING DEVICE FOR TRACTOR CLUTCH MECHANISM
Filed Jan. 21, 1922
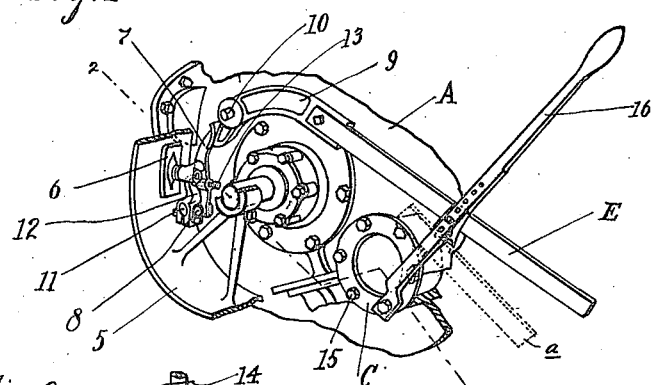
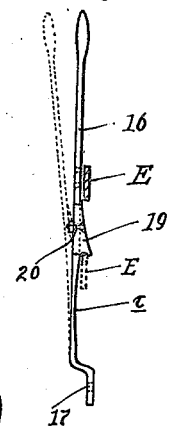
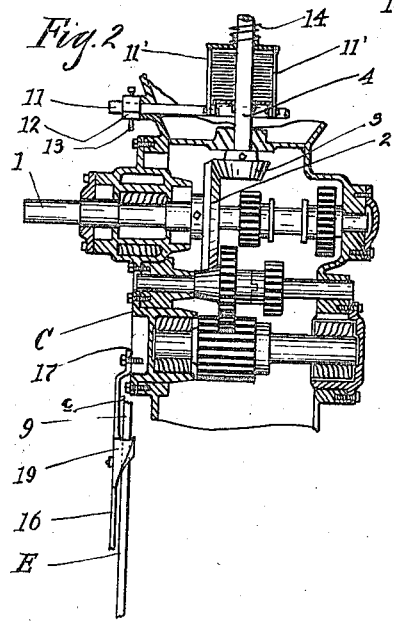
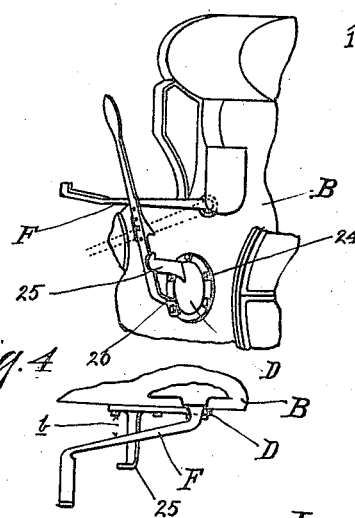
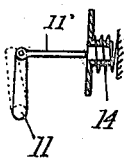
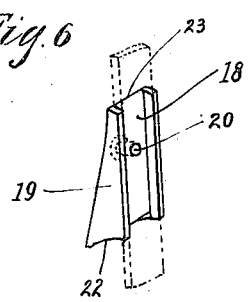
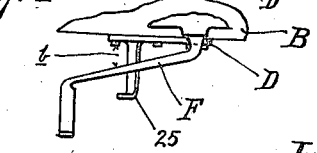
Inventors,
Azel W. Johnson
Andrew W. Johnson
by H. S. Johnson
their Attorney.

Patented Jan. 1, 1924.

1,479,241

UNITED STATES PATENT OFFICE.

AXEL W. JOHNSON AND ANDREW W. JOHNSON, OF ROCK CREEK, MINNESOTA.

LOCKING DEVICE FOR TRACTOR CLUTCH MECHANISM.

Application filed January 21, 1922. Serial No. 530,772.

*To all whom it may concern:*

Be it known that we, AXEL W. JOHNSON and ANDREW W. JOHNSON, citizens of the United States, residing at town of Rock Creek, in the county of Pine and State of Minnesota, have invented certain new and useful Improvements in Locking Devices for Tractor Clutch Mechanism, of which the following is a specification.

This invention relates to devices for use in connection with clutch control levers of gasoline tractors, and has for one of its objects to provide an attachment which is adapted to be readily attached to the tractor body adjacent the clutch control lever thereof, for the purpose of arbitrarily holding the latter at the particular position it assumes when the clutch is in released state, that is, when the traction wheels are disconnected from the power unit to render them inoperative. There are times when it is desirable, to have some means for holding the power unit disconnected from the drivers, especially in case of a break-down, when the tractor must be towed a considerable distance, or when making certain repairs.

It is a further object of our invention to provide a device for the purpose set forth which may be readily attached, without the necessity of cutting the tractor body or drilling and tapping extra holes, so that an inexperienced person could readily attach the device to certain makes of tractors for which the device is designed to be used.

The invention consists in the construction, combination and arrangement of parts hereinafter described and claimed.

In the accompanying drawings forming part of this specification, we have shown our invention attached to the well known Samson tractor, and to a Fordson tractor. Both of these tractors include in their outer structure, a circular cover plate which is secured in definite position by means of cap screws which are removable from the outside. Further, each of these tractors has clutch controlling means adjacent said cover plates, of which fact we have taken advantage, to render our invention inexpensive to manufacture, practical as a useful attachment, and extremely simple to apply.

In the drawings:

Figure 1, is a fragmentary perspective view of the side of a Samson tractor, showing the belt wheel and its supporting shaft, and the cover plate with the invention attached, adjacent said shaft.

Figure 2, is a sectional view on line 2—2 of Figure 1.

Figure 3, is a fragmentary perspective view of the outside of a Fordson tractor showing the cover plate, and the invention attached thereto.

Figure 4, is a top view of a part of Figure 3, showing the clutch control and cover plate.

Figure 5, is a side view of a lever embodying our invention.

Figure 6, is a perspective view of a detail of the lever, and

Figure 7, is a side elevation of a part of the clutch mechanism.

A and B designate respectively a portion of the body of a Samson and Fordson tractor.

C and D designate respectively the cover plates of said tractors and E and F respectively the clutch control levers thereof.

In Figure 1 of the drawings, 1 designates the belt wheel shaft carrying an inner bevel gear 2, in mesh with a bevel pinion 3 on the clutch shaft 4. The shaft carries a belt pulley 5, which latter is adapted to engage with the brake shoe 6, carried by the lever 7, said lever pivoted at 8, and engaging at its top with the fulcrumed lever 9, the latter fulcrumed at 10.

A shaft 11 carries a lever arm 12, which latter is engaged by set screws 13 in the lever 7, so that when the lever E is actuated downwardly the lever 7 will in turn, operate to release the disks of the clutch, which latter are shown somewhat diagrammatically to indicate its operation. The shaft 11, when rotated, will compress (by means of rods 11′) the spring 14, which normally presses the disks together, thereby releasing the disks. Simultaneously the brake shoe will engage the pulley 5, to prevent it from running by momentum when the gears are shifted to change the speed. The lever E is normally constantly held in the position shown by means of suitable spring means not shown. When in this position the clutch is engaged, so that when the operator wishes to release the clutch for the purpose of shifting gears or to reverse, the lever is depressed by the foot to the position shown in dotted lines at *a*. When the foot is removed, the lever is automatically returned by its spring means.

Adjacent the shaft 1, is the cover plate C, which latter in the tractor shown, carries a journal bearing upon its inner end. The cover plate is held positioned on the side of the tractor by the cap screws 15.

Our invention comprises a lever 16 bent inwardly and downwardly at its lower end and having a bolt hole 17 in said end. The lever is formed of flat relatively thin steel and is constructed intermediate its ends of uniform width so as to fit into the channel 18 (Fig. 6) of the shoulder block 19 the latter being provided with a bolt hole 20.

The lever is provided with a row of bolt holes 21, suitably spaced and adapted to register with the hole 20 in the shoulder block 19, so that the block may be bolted to the lever at various positions. The shoulder block is formed with an outwardly and downwardly inclined shoulder 22 which extends from the inner face of the lever as best shown in Figure 5, and has its outer side inclined to form a feather edge 23 at its upper end, whereby is formed a continuous somewhat smooth inclined approach to said shoulder, located on the inner side of the lever.

The lever 16 is suitably fastened by means of one of the cap screws 15 to the side of the tractor and extends to and beyond the lever E. The shoulder block is then bolted in suitable position so that when the lever 16 is thrust downwardly it will frictionally engage the inner side of the lever 16 and flex it outwardly as indicated in dotted lines in Figure 5 to permit it to pass the shoulder block. The lever will then spring inwardly and lock the clutch lever E in its downward position whereby as hereinafter described the clutch will be released.

When it is desired to re-engage the clutch the lever is pushed downwardly by the foot and the lever 16 sprung outwardly to release the clutch lever. Referring to Figure 3, of the drawings, the clutch lever F of the Fordson tractor holds the clutch in engagement when positioned as shown in Figures 3 and 4. When it is desired to release the clutch the lever is depressed similar to the lever 16 above described, whereby the clutch is released.

The cover plate D is circular in form and is, also, held positioned by means of cap screws 24 and is provided with an outwardly extending foot rest 25. The lever is constructed similar to the lever 16 excepting that at its lower extremity the offset at 26 is somewhat greater than that of the lever 16 owing to the greater space at *b* (Fig. 4) otherwise the levers will operate similar to the lever 16 on the Fordson tractor. The shoulder block however, will be required to be adjusted to meet the dimensions in the Fordson tractor by means of the bolt holes 21 as the distance from the cap screws 24 to the lever varies slightly from that of the Samson tractor.

The lever 16, is preferably made thinner at *c*, so that it will be more easily flexed outwardly, but it is to be understood that it may be made of relative thin flat bar steel of uniform thickness.

We claim:

The combination with the clutch lever of a tractor, said clutch lever being mounted to extend longitudinally of the tractor on the outside thereof, and adapted to be moved from a normal position downward to effect a certain desired change in the operation of the clutch; of a lever made of spring metal firmly secured at its lower end to the tractor and capable of being sprung outwardly, said lever extending outwardly across and upwardly to and beyond said clutch lever, a shoulder member on said lever, said shoulder member being disposed in the path traversed by said clutch lever when the latter is manually moved downward to effect a change of operation of the clutch, and means for arbitrarily securing said shoulder member at different points on said lever to fit different tractors, said means including a row of bolt holes extending longitudinally of the lever, and a block having a bolt hole in register with said row of bolt holes, whereby it may be bolted to the lever at different locations, said block having a downwardly facing end to form a shoulder, and being formed with a longitudinally disposed groove adapted to receive said lever to be slidable thereon, and an outer face extending from the outer edge of said downwardly facing end, upwardly and inwardly to the bottom of said groove to form a feather edge thereat, for the purpose set forth.

In testimony whereof we affix our signatures.

AXEL W. JOHNSON.
ANDREW W. JOHNSON.